United States Patent
Nakanishi et al.

(10) Patent No.: US 10,814,269 B2
(45) Date of Patent: Oct. 27, 2020

(54) LIQUID HAVING OXYGEN ABSORBING ABILITY, METHOD FOR PRODUCING SAME, AND COMPLEX SOLUTION CONTAINING SAME

(71) Applicants: Sharp Kabushiki Kaisha, Sakai, Osaka (JP); NATIONAL UNIVERSITY CORP. KOBE UNIVERSITY, Kobe-shi, Hyogo (JP)

(72) Inventors: Yasunori Nakanishi, Sakai (JP); Hideto Matsuyama, Kobe (JP); Eiji Kamio, Kobe (JP); Atsushi Matsuoka, Kobe (JP)

(73) Assignees: SHARP KABUSHIKI KAISHA, Sakai (JP); NATIONAL UNIVERSITY CORP. KOBE UNIVERSITY, Hyogo (JP)

( * ) Notice: Subject to any disclaimer, the term of this patent is extended or adjusted under 35 U.S.C. 154(b) by 0 days.

(21) Appl. No.: 16/072,889

(22) PCT Filed: Jan. 19, 2017

(86) PCT No.: PCT/JP2017/001750
§ 371 (c)(1),
(2) Date: Jul. 26, 2018

(87) PCT Pub. No.: WO2017/130833
PCT Pub. Date: Aug. 3, 2017

(65) Prior Publication Data
US 2019/0001260 A1 Jan. 3, 2019

(30) Foreign Application Priority Data
Jan. 27, 2016 (JP) ................. 2016-013384

(51) Int. Cl.
*B01D 53/14* (2006.01)
*C07F 15/06* (2006.01)

(52) U.S. Cl.
CPC ......... *B01D 53/1493* (2013.01); *B01D 53/14* (2013.01); *C07F 15/06* (2013.01);
(Continued)

(58) Field of Classification Search
None
See application file for complete search history.

(56) References Cited

U.S. PATENT DOCUMENTS 6,436,171 B1 * 8/2002 Wang .................. B01D 53/02
423/219
2003/0225303 A1 12/2003 Magna et al.
(Continued)

FOREIGN PATENT DOCUMENTS

EP 1 970 119 A1 9/2008
JP 2003-327556 A 11/2003
(Continued)

OTHER PUBLICATIONS

Official Communication issued in International Patent Application No. PCT/JP2017/001750, dated Mar. 28, 2017.
(Continued)

*Primary Examiner* — William D Young
(74) *Attorney, Agent, or Firm* — Keating & Bennett, LLP

(57) ABSTRACT

A liquid having oxygen absorbing ability, comprising a cobalt-salen complex or a derivative thereof and an ionic liquid formed from an anion having an amine structure and a cation of an aliphatic quaternary phosphonium or ammonium having alkyl chains with each 2-20 carbon atoms, wherein the anion of the ionic liquid is coordinated to a cobalt ion of the cobalt-salen complex or a derivative thereof.

8 Claims, 2 Drawing Sheets

(52) U.S. Cl.
CPC .... *B01D 2252/30* (2013.01); *B01D 2252/504* (2013.01); *B01D 2257/104* (2013.01); *Y02P 20/126* (2015.11)

(56) References Cited

U.S. PATENT DOCUMENTS

| | | |
|---|---|---|
| 2005/0085410 A1 | 4/2005 | Tsuchida et al. |
| 2008/0209876 A1* | 9/2008 | Miller ................ G11C 13/0009 55/522 |
| 2010/0089236 A1 | 4/2010 | Subramaniam et al. |
| 2014/0377156 A1 | 12/2014 | Okada et al. |

FOREIGN PATENT DOCUMENTS

| | | |
|---|---|---|
| JP | 2005-097290 A | 4/2005 |
| WO | 2013/118776 A1 | 8/2013 |

OTHER PUBLICATIONS

Kohno et al., "Reversible and Selective O2 Binding Using a New Thermoresponsive Cobalt(II)-Based Ionic Liquid", Industrial & Engineering Chemistry Research, 2015, vol. 54, pp. 12214-12216.
Hajipour, A. et al.; "Basic Ionic Liquids. A Short Review"; Journal of the Iranian Chemical Society; vol. 6, No. 4; Dec. 2009; pp. 647-678.
Official Communication issued in corresponding Chinese Patent Application No. 201780008979.9, dated Aug. 12, 2020.
Liangnian et al., "Introduction to Bioinorganic Chemistry", Sun Yat-sen University Press, 2nd edition, Sep. 30, 2001, 3 pages.

* cited by examiner

[Fig. 1]
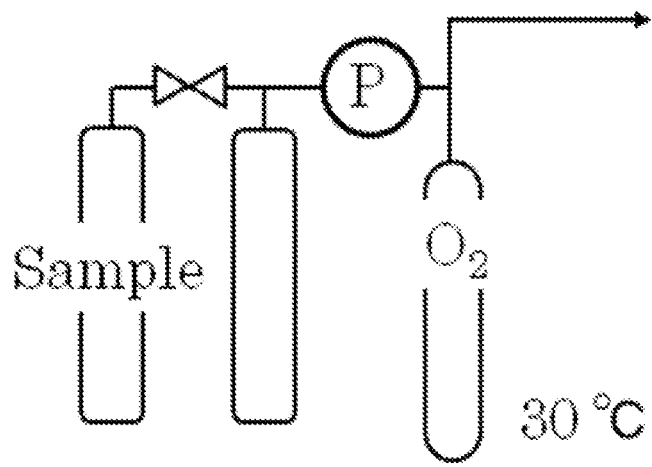
[Fig. 2]
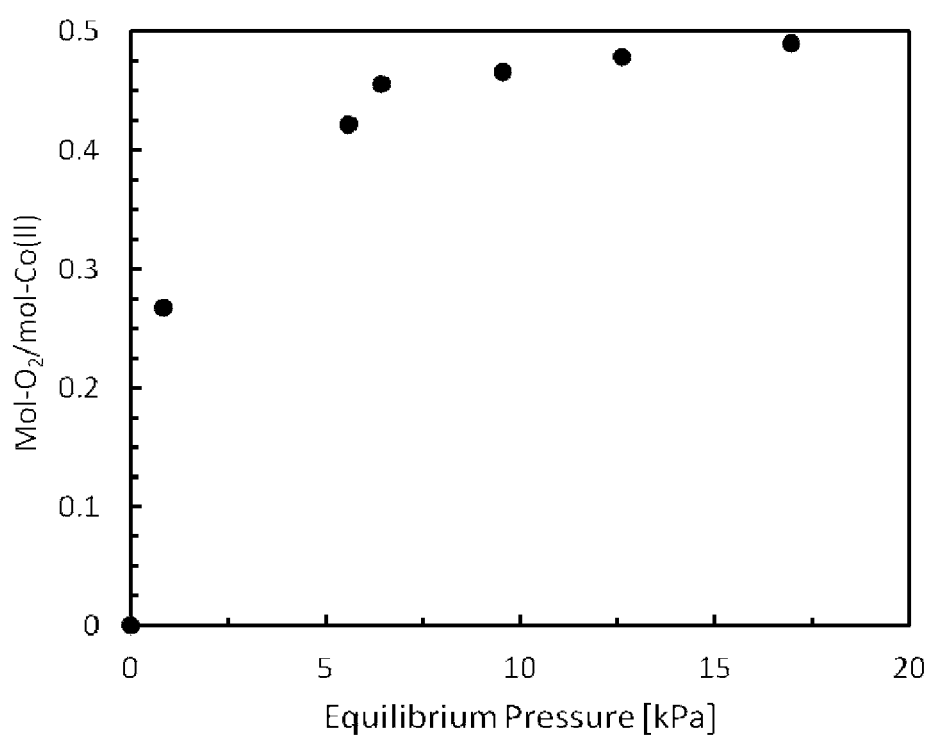

[Fig. 3]
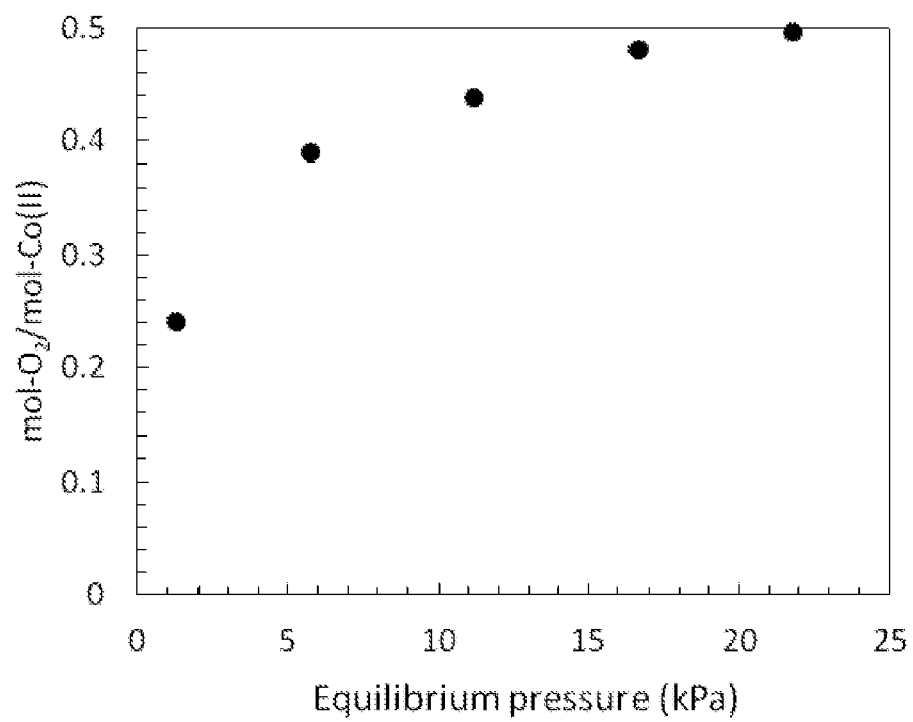
[Fig. 4]
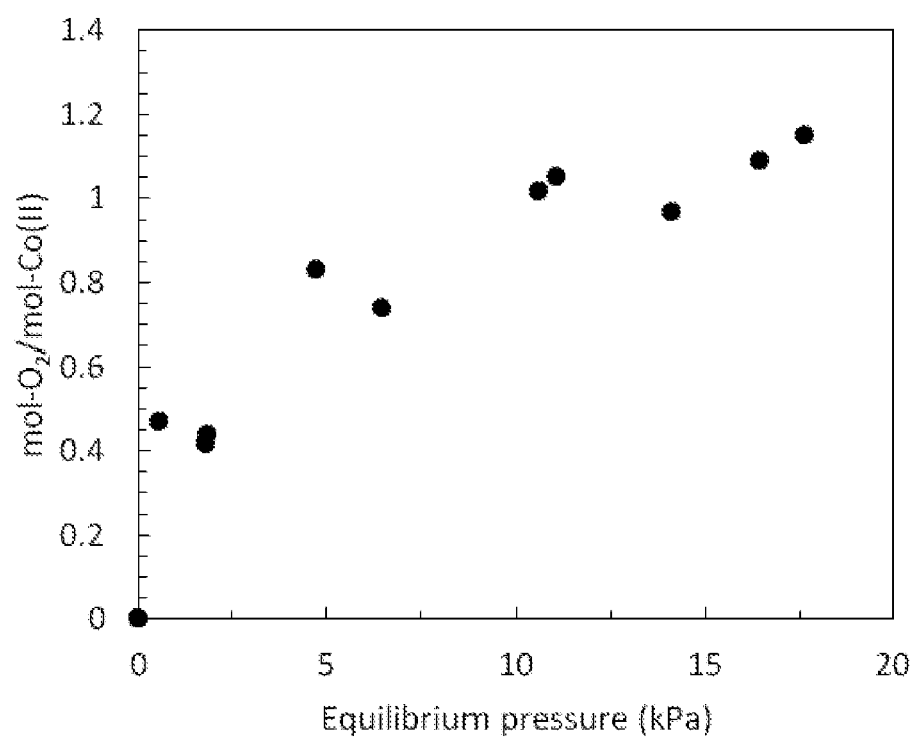

LIQUID HAVING OXYGEN ABSORBING ABILITY, METHOD FOR PRODUCING SAME, AND COMPLEX SOLUTION CONTAINING SAME

TECHNICAL FIELD

The present invention relates to a liquid having oxygen absorbing ability, a method for producing the same and a complex solution containing the same.

BACKGROUND ART

Separation technique and process of mixed gas can be applied to exhaust gas purification, deodorization treatment, specific compound extraction, energy saving and the like and thus is useful not only for industrial applications but also for consumer applications. Gas absorbents are an important element in the above applications and thus various absorbents have been developed.

Among various kinds of gas, oxygen is one of the gases familiar to our everyday life and it may be no exaggeration to say that oxygen is involved in numerous chemical reactions typically including breathing, combustion, catalytic reactions and molecular syntheses. However, handling of oxygen is not easy. Namely, in order to selectively absorb, concentrate or store oxygen molecules, a control and reaction mechanism that reversibly captures oxygen molecules is required, and the number of efficient mechanisms is limited. In addition, oxygen has almost the same molecular size as nitrogen, which accounts for a main portion of air together with oxygen, and thus cannot be separated by sieving according to the size. Therefore, there is a need for a control mechanism and an excellent absorbent (absorbing material) that can selectively capture oxygen.

Various inorganic materials and organic materials (molecular materials) have been proposed as oxygen absorbing materials for application of deoxydants. Deoxydants of various specifications have been put into practical use and are used for keeping food products fresh and preventing deterioration of medical products and cosmetics. However, the materials are solid and are required to be packed or be mixed into resins to be processed into films upon use. Moreover, the oxygen absorbing ability of the products is irreversible and thus the products cannot be used for applications requiring repeated or continuous use.

Metal complex materials can adsorb and desorb oxygen reversibly and repetitively. A typical example of the mechanism is oxygen transport reaction by heme protein in hemoglobin, which involves adsorption and desorption of oxygen by porphyrin-iron ion complex.

Japanese Unexamined Patent Publication No. 2005-097290 (Patent Document 1) proposes a method for producing a complex between albumin and a metal complex having a porphyrin structure capable of adsorbing/desorbing oxygen in vivo. The complex is demonstrated to have oxygen adsorbing/desorbing ability as a biomimetic model. However, given the complex synthetic process, stability of the functional molecular structure and the like thereof, the complex is hardly practical.

Meanwhile, a cobalt-salen complex is one of the substances exhibiting high affinity with oxygen. Salen compounds and metal complexes thereof are practical compared to the metal complex having the porphyrin structure above and have already been widely used as catalysts for molecular synthesis.

Salen ("N,N'-bis(salicylidene)ethylenediamine" or "N,N'-bis(2-hydroxybenzylidene)ethylenediamine") has a planar structure as a quadridentate ligand of a metal ion and other ligands may further coordinate to the metal ion vertically relative to the plane. For example, when salen coordinates to a cobalt ion and a basic molecule such as pyridine or imidazole coordinates to the cobalt ion vertically on one side, an oxygen molecule can reversibly coordinate to another side, thereby serving as a material having oxygen absorbing ability (oxygen absorbent).

Japanese Unexamined Patent Publication No. H9(1997)-151192 (Patent Document 2) and Japanese Unexamined Patent Publication No. H9(1997)-151193 (Patent Document 3) respectively propose a liquid for oxygen separation comprising a cobalt-salen complex having a plurality of substituents and another ligand both of which dissolved in an organic solvent.

As described above, salen complexes have been widely studied on the structures and functionalities thereof as oxygen absorbents, without making full use thereof. This is because salen complexes are required to be dissolved at a high concentration in an organic solvent when used as oxygen absorbents in order to sufficiently exploit oxygen absorbing ability of the complexes. There is also a possibility of contamination of volatilized solvent components into extracted oxygen gas. These are the possible reasons that salen complexes have not yet been applied for practical use.

In recent years, use of so-called ionic liquid, which is a liquid substance composed only of ion components of cations and anions having a vapor pressure of almost zero has been studied as a complex that exists in a liquid state stable at normal temperature. It is an important feature of a complex to be in a liquid state or have high compatibility with another liquid in order to be used as an absorbent.

Yuki Kohno et al., "Reversible and Selective $O_2$ Binding Using a New Thermoresponsive Cobalt(II)-Based Ionic Liquid", Industrial & Engineering Chemistry Research, 2015, vol. 54, p. 12214-12216 (Non-Patent Document 1) discloses that when an ionic liquid comprising a complex of a cobalt ion coordinated to histidine and imidazole was synthesized and a liquid film thereof was placed in either oxygen or nitrogen atmospheres, it resulted in that the liquid film showed higher absorbing ability for oxygen than nitrogen. However, the ionic liquid comprising the complex has extremely high viscosity despite being a liquid, and is required to be diluted in an organic solvent and then dried in order to prepare an impregnated film.

CITATION LIST

Patent Literatures

Patent Document 1: Japanese Unexamined Patent Publication No. 2005-097290
Patent Document 2: Japanese Unexamined Patent Publication No. H9(1997)-151192
Patent Document 3: Japanese Unexamined Patent Publication No. H9(1997)-151193

Non-Patent Literatures

Non-Patent Document 1: Yuki Kohno et al., "Reversible and Selective $O_2$ Binding Using a New Thermoresponsive Cobalt(II)-Based Ionic Liquid", Industrial & Engineering Chemistry Research, 2015, vol. 54, p. 12214-12216

SUMMARY OF INVENTION

Technical Problems

In order to synthesize a complex that has high absorbing ability as an oxygen absorbent and is in the state that is easily used in later stage, the molecule is required to have high freedom of functional design, which leads to bringing out the ability and further improving preferable properties thereof. In Non-Patent Document 1, the selectivity of oxygen absorption and production of the complex molecule in liquid form are realized by accumulation of components. Specifically, whole component constitutes the site affecting to the functionality (absorbing ability) and the site affecting to production of the complex molecule in liquid form, and thus it is extremely difficult to realize the functional design that allows improvements of the respective properties separately. Namely, as there are various molecular structures of components constituting the complex and various combinations thereof, it is difficult to control multiple properties interacting each other and therefore a rational and strategic synthesis process is required.

Thus, an object of the present invention is to provide a cobalt complex in liquid state that is stable as a material selectively and reversibly absorbs oxygen.

Solution to Problems

The inventors of the present invention studied the molecular structure that allows a complex structure having oxygen absorbing ability to be obtained in liquid state and a rational synthesis process thereof. As a result, the inventors found that a structure including, as a basic functional moiety, a complex structure of a salen molecule or a derivative thereof and cobalt, and an ionic liquid having an amine structure coordinated to the cobalt ion allows both oxygen absorbing ability and production of the cobalt complex in liquid form, thereby achieving the present invention.

Accordingly, the present invention provides a liquid having oxygen absorbing ability comprising a cobalt-salen complex or a derivative thereof and an ionic liquid formed from an anion having an amine structure and a cation of an aliphatic quaternary phosphonium or ammonium having alkyl chains with each 2-20 carbon atoms, wherein the anion of the ionic liquid is coordinated to a cobalt ion of the cobalt-salen complex or a derivative thereof.

The present invention also provides a complex solution having oxygen absorbing ability, comprising the liquid having oxygen absorbing ability dissolved in a second ionic liquid.

The present invention further provides a method for producing the liquid having oxygen absorbing ability, comprising:

mixing the cobalt-salen complex or a derivative thereof and an ionic liquid formed from an anion having an amine structure and a cation of an aliphatic quaternary phosphonium or ammonium having alkyl chains with each 2-20 carbon atoms under an oxygen-containing atmosphere and dissolving the cobalt-salen complex or a derivative thereof in the ionic liquid, thereby obtaining a coordination structure between the cobalt-salen complex or a derivative thereof and the ionic liquid.

Advantageous Effects of Invention

The present invention can provide a cobalt complex in liquid state that is stable as a material selectively and reversibly absorb oxygen. Namely, the present invention can provide a complex in liquid form that can efficiently absorb oxygen and formed from a cobalt-salen complex or a derivative thereof and an ionic liquid having an amine structure.

The liquid having oxygen absorbing ability of the present invention exhibits the above effects further efficiently when one of following requirements are fulfilled:

the ionic liquid comprises an anion of a secondary amine;
the ionic liquid comprises an anion of N-methylglycine;
the ionic liquid comprises a cation of trihexyl(tetradecyl)phosphonium; and
the cobalt-salen complex is N,N'-bis(salicylidene)ethylenediaminocobalt(II).

The complex solution having oxygen absorbing ability of the present invention exhibits the above effects further efficiently when one of following requirements are fulfilled:

the second ionic liquid comprises an anion of bis(trifluoromethanesulfonyl)imide;
the second ionic liquid is trihexyl(tetradecyl)phosphonium bis(trifluoromethanesulfonyl)imide; and
the second ionic liquid comprises the liquid having oxygen absorbing ability at a concentration of 1 to 80% by mass.

BRIEF DESCRIPTION OF DRAWINGS

FIG. 1 is a schematic view of an absorption test device for measuring the amount of oxygen absorption;

FIG. 2 is an oxygen absorption isotherm of the liquid of Example 1 at a temperature of 30° C.;

FIG. 3 is an oxygen absorption isotherm of the liquid of Example 2 at a temperature of 30° C.; and FIG. 4 is an oxygen absorption isotherm of the liquid of Example 3 at a temperature of 30° C.

DESCRIPTION OF EMBODIMENTS

The embodiments of the present invention are more specifically described hereinafter. However, the embodiments do not limit the present invention.

The liquid having oxygen absorbing ability (hereinafter also referred to as "oxygen absorbing liquid") of the present invention is characterized in that the liquid comprises a cobalt-salen complex or a derivative thereof (hereinafter the complex and the derivative are also collectively referred to as "cobalt-salen complex") and an ionic liquid formed from an anion having an amine structure and a cation of an aliphatic quaternary phosphonium or ammonium having alkyl chains with each 2-20 carbon atoms, and the anion of the ionic liquid is coordinated to a cobalt ion of the cobalt-salen complex.

The "derivative of the cobalt-salen complex" as used herein means a cobalt-salen complex including a substituent introduced in the salen structure (skeleton).

The oxygen absorbing liquid of the present invention is formed from a cobalt-salen complex and an ionic liquid coordinated thereto.

An anion having a basic nitrogen atom is coordinated to the cobalt ion of the cobalt complex in the axis direction and the anion forms the ionic liquid together with a counter cation. The anion used in the present invention preferably has a secondary amine structure because the binding ability of an oxygen molecule coordinated to the other side along the axis direction is stronger when the basicity of the nitrogen on the anion is stronger.

(Cobalt-Salen Complex)

The cobalt-salen complex that may be used in the present invention is a metal complex well known per se having a structure in which salen or a salen derivative having a substituent coordinates to a cobalt(II) ion as a quadridentate ligand, and may be represented by, for example, the general formula (1):

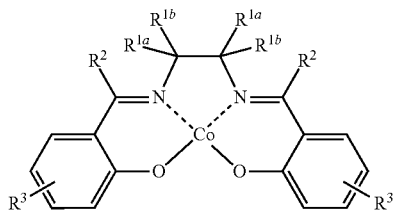

(1)

wherein $R^{1a}$, $R^{1b}$, $R^2$ and $R^3$ are the same or different and respectively are a hydrogen atom, a halogen atom, an alkyl or haloalkyl group with 1-6 carbon atoms, an alkoxy group with 1-6 carbon atoms, an acyl group with 1-6 carbon atoms, an amino group, a nitro group, a nitrile group (cyano group), a vinyl group or an aryl or heteroaryl group with 6-12 carbon atoms; and $R^{1a}$ and $R^{1b}$ may bind each other through an atom or an atomic group bound thereto to form a ring structure.

Various metals may coordinate to the molecule of the cobalt salen or a derivative thereof; however, a cobalt(II) ion is the most preferable because of the absorbing ability of oxygen molecules.

The substituents $R^{1a}$, $R^{1b}$, $R^2$ and $R^3$ in the general formula (1) are hereinafter described.

The halogen atom includes fluorine, chlorine, bromine and iodine.

The alkyl group with 1-6 carbon atoms includes linear and branched alkyl groups such as methyl, ethyl, n-propyl, isopropyl, n-butyl, isobutyl, sec-butyl, tert-butyl, n-pentyl, neopentyl and n-hexyl.

The haloalkyl group with 1-6 carbon atoms includes alkyl groups described above in which any hydrogen atom is substituted by the halogen atom described above. Specific examples thereof include fluoromethyl, chloromethyl, bromomethyl, trifluoromethyl and the like.

The alkoxy group with 1-6 carbon atoms includes linear or branched alkoxy groups such as methoxy, ethoxy, n-propoxy, isopropoxy, n-butoxy, n-pentoxy and n-hexoxy.

The acyl group with 1-6 carbon atoms includes aliphatic acyl groups such as formyl, acetyl, propionyl, butyryl, isobutyryl, valeryl, isovaleryl, pivaloyl and hexanoyl.

The aryl and heteroaryl groups with 6-12 carbon atoms include phenyl, tolyl, xylyl, fluorophenyl, chlorophenyl, bromophenyl, naphthyl and the like.

$R^{1a}$ and $R^{1b}$ may be the same or different and may bind each other through an atom or an atomic group bound thereto to form a ring structure, and the substitution position of the substituent $R^3$ is arbitrary.

The cobalt-salen complex may be produced by, for example, synthesizing salen or a salen derivative by dehydration condensation of a corresponding salicylaldehyde and ethylenediamine in a solvent such as ethanol and reacting the obtained salen or salen derivative as a ligand with a cobalt ion under a basic condition. Alternatively, the cobalt-salen complex may be obtained by adding an acetate salt of cobalt during synthesis of salen or a salen derivative.

By using synthetic raw materials which are salicylaldehyde and ethylenediamine respectively having substituents, various structures of salen derivatives may be obtained.

Substituted salicylaldehydes include dihydroxybenzaldehyde, chlorosalicylaldehyde, bromosalicylaldehyde, fluorosalicylaldehyde, aminosalicylaldehyde, methylsalicylaldehyde, tert-butylsalicylaldehyde, methoxysalicylaldehyde, ethoxysalicylaldehyde and the like.

Substituted ethylenediamines include 1,2-dimethylethylenediamine, 1,1,2,2-tetramethylethylenediamine, 1,2-cyclohexanediamine, 1,2-diphenylethylenediamine and the like.

Cobalt-salen derivatives obtained by combining the above include, in addition to cobalt-salen, namely N,N'-bis(salicylidene)ethylenediaminocobalt(II), N,N'-bis(salicylidene)-1,2-dimethylethylenediaminocobalt(II), N,N'-bis(salicylidene)-1,1,2,2-tetramethylethylenediaminocobalt(II), N,N'-bis(salicylidene)-1,2-cyclohexanediaminocobalt(II), N,N'-bis(3-methylsalicylidene)ethylenediaminocobalt(II), N,N'-bis(5-methylsalicylidene)ethylenediaminocobalt(II), N,N'-bis(3-ethoxysalicylidene)ethylenediaminocobalt(II), N,N'-bis(3,5-di-tert-butylsalicylidene)-1,2-cyclohexanediaminocobalt(II), N,N'-bis(3-ethoxysalicylidene)-1,1,2,2-tetramethylethylenediaminocobalt(II) and the like. Among others, N,N'-bis(salicylidene)ethylenediaminocobalt(II) is particularly preferred in terms of oxygen absorbing ability.

Cobalt-salen complexes disclosed in Japanese Unexamined Patent Publication No. H6(1994)-340683, Pier Giorgio Cozzi, "Metal-Salen Schiff base complexes in catalysis: practical aspects", Chemical Society Reviews, 2004, vol. 33, p. 410-421 and Eric C. Niederhoffer et al., "Thermodynamics of Oxygen Binding in Natural and Synthetic Dioxygen Complexes", Chemical Reviews, 1984, vol. 84, p. 137-203 and citations therein may be used.

(Ionic Liquid)

The ionic liquid preferably has a secondary amine structure as the anion as described above and particularly preferably is an N-alkylamino acid corresponding an amino acid having an alkyl chain on the amino group, which is generally used as an anion of an ionic liquid and has a secondary amine structure. The alkyl chain may be any of those with 1-8 carbon atoms. However, because an increased number of carbon atoms increases an effect of steric hinderance upon coordination, the number of carbon atoms is preferably low. The alkyl chain is preferably methyl or ethyl and particularly preferably methyl. The type of amino acid is preferably glycine having the lowest molecular weight by taking the steric effect upon coordination into account. Therefore, the anionic ligand is particularly preferably N-methylglycine (aminoacetic acid).

The cation which is a counter ion of the anion may be phosphonium or ammonium which may be included in common ionic liquid, and is particularly preferably an aliphatic quaternary phosphonium or ammonium having alkyl chains with each 2-20 carbon atoms.

The ionic liquid may be obtained by anion exchange reaction between a compound serving as the anion and a phosphonium salt or an ammonium salt serving as the cation.

The phosphonium salt and the ammonium salt may be tetramethylphosphonium bromide, tetraethylphosphonium bromide, tetrabutylphosphonium bromide, tetrahexylphosphonium bromide, triethylhexylphosphonium bromide, triethyloctylphosphonium bromide, triethyl(2-methoxyethyl) phosphonium bromide, tributyloctylphosphonium bromide, tributyldodecylphosphonium bromide, tributyl(2-methoxyethyl)phosphonium bromide, trihexyldodecylphosphonium bromide, trihexyl(tetradecyl)phosphonium bromide and chlorides corresponding to the above bromides.

Not all combinations of the above phosphonium salts or ammonium salts and anions coordinating in the axis direction of the cobalt complex form liquid at normal temperature. Therefore, among others, triethyloctylphosphonium bromide, tributyloctylphosphonium bromide, trihexyl(tetradecyl)phosphonium bromide which, in combination with an anion, have low melting points and thus easily form ionic liquid are preferred, and trihexyl(tetradecyl)phosphonium bromide which forms ionic liquid in combination with many anions is particularly preferred.

(Production Method of Oxygen Absorbing Liquid)

The oxygen absorbing liquid of the present invention may be produced by mixing the cobalt-salen complex and an ionic liquid formed from an anion having an amine structure and a cation of an aliphatic quaternary phosphonium or ammonium having alkyl chains with each 2-20 carbon atoms under an oxygen-containing atmosphere to dissolve the cobalt-salen complex in the ionic liquid and obtaining a coordination compound of the cobalt-salen complex and the ionic liquid.

The proportion of the cobalt-salen complex and effective components of the ionic liquid may be such that the moles of the cobalt-salen complex and the moles of the effective components of the ionic liquid are almost equivalent, or the moles of effective components of the cobalt-salen complex are excessive.

The coordination compound of the cobalt-salen complex and the ionic liquid may be confirmed according to well-known methods such as comprehensive analyses including ultraviolet-visible spectroscopy, $^{59}$Co-NMR spectroscopy and color change.

(Oxygen Absorbing Liquid)

The oxygen absorbing liquid of the present invention selectively binds to oxygen and may adsorb 1 equivalent of oxygen at maximum relative to an equivalent of the complex. Further, the oxygen absorbing liquid allows reversible adsorption and desorption of ½ equivalent of oxygen relative to an equivalent of the complex under conditions in which adsorption and desorption reactions of oxygen proceed repetitively and stably. In order to increase the dispersibility of oxygen in the liquid, it is preferable to mix with a second ionic liquid to decrease the viscosity before use.

Thus, the oxygen absorbing liquid of the present invention is preferably used as a complex solution having oxygen absorbing ability containing the oxygen absorbing liquid dissolved in a second ionic liquid.

The second ionic liquid preferably has similar properties to the oxygen absorbing liquid of the present invention and has a low viscosity. The optimal viscosity depends on the usage form of the oxygen absorbent. It is preferable that the second ion liquid allows preparation of a solution having as high concentration as possible within the range of viscosity allowing easy handling in order to increase the oxygen absorption.

The second ionic liquid may be commonly used ionic liquid.

The cations thereof which are known include imidazolium, pyridinium, pyrrolidinium, phosphonium, ammonium and the like. In the present invention, phosphonium and ammonium are particularly preferred in view of compatibility.

The anions which are well known include tetrafluoroborate, hexafluorophosphonate, trifluoroacetate, trifluoromethanesulfonate, bis(trifluoromethanesulfonyl)imide and the like. In the present invention, bis(trifluoromethanesulfonyl)imide is particularly preferred because it may provide the lowest viscosity.

Thus, the second ionic liquid is particularly preferably trihexyl(tetradecyl)phosphonium bis(trifluoromethanesulfonyl)imide.

The liquid having oxygen absorbing ability of the present invention preferably contains the oxygen absorbing liquid at a concentration of 1 to 80% by mass in the second ionic liquid.

When the concentration of the oxygen absorbing liquid is less than 1% by mass, the obtained oxygen absorbing ability may not be sufficient. When the concentration of the oxygen absorbing liquid exceeds 80% by mass, the complex solution having oxygen absorbing ability may have high viscosity, making handling thereof difficult.

Specific concentrations (% by mass) of the oxygen absorbing liquid include 1, 5, 10, 15, 20, 25, 30, 35, 40, 45, 50, 55, 60, 65, 70, 75 and 80.

The concentration of the oxygen absorbing liquid which is preferable and allows relatively easy handling is 20 to 50% by mass and more preferably 30 to 50% by mass.

EXAMPLES

The present invention is hereinafter specifically described by way of Examples which do not limit the present invention.

Example 1

[Preparation of Ionic Liquid]

To 100 ml of ethanol, 5.64 g (10 mmol) of trihexyl(tetradecyl)phosphonium bromide (produced by Sigma-Aldrich, purity >95%) and 20 g of anion exchange resin (produced by Sigma-Aldrich, Amberlite® IBN78 hydroxide form) were added and stirred to carry out hydroxide substitution reaction. Thereafter, the reaction solution was separated by vacuum filtration, an aqueous solution obtained by dissolving 0.98 g (11 mmol) of N-methylglycine (produced by Tokyo Chemical Industry, Co., Ltd., purity >98%) in 20 ml of pure water was added for reaction, the solvent and unreacted matters were removed by concentration under reduced pressure, thereby obtaining 4.88 g of ionic liquid formed from trihexyl(tetradecyl)phosphonium cation and N-methylglycine anion.

[Preparation of Liquid Having Oxygen Absorbing Ability]

The thus-obtained ionic liquid (1.30 g, effective components: 2.3 mmol) and 2.35 g (7.2 mmol) of N,N'-bis(salicylidene)ethylenediaminocobalt(II) (produced by Tokyo Chemical Industry, Co., Ltd., purity >95%) were then added to 50 ml of ethanol and stirred at room temperature for 3 hours, the solvent and unreacted matters were removed by concentration under reduced pressure, thereby obtaining 1.82 g of desired liquid having a cobalt-salen complex structure.

By ultraviolet-visible spectroscopy, observation of the developed color and the like, it was verified that the anion of the ionic liquid was coordinated to the cobalt ion of the cobalt-salen complex.

The obtained liquid was stable and no weight change was observed after maintaining the liquid in a solution of trihexyl(tetradecyl)phosphonium bis(trifluoromethanesulfonyl)imide at 100° C. for 10 hours. In addition, no weight change was observed after heating to around 200° C., and thus it was verified that the liquid had high heat resistance for a molecule of an organic molecular component composition, similar to typical ionic liquids.

[Preparation of Complex Solution]

In order to evaluate oxygen absorbing ability of the obtained liquid, the obtained liquid was dissolved in trihexyl (tetradecyl)phosphonium bis(trifluoromethanesulfonyl) imide synthesized according to Dr. Tom Vander Hoogerstraete et al., "Selective Single-Step Separation of a Mixture of three Metal Ions by a Triphasic Ionic-Liquid-Water-Ionic-Liquid Solvent Extraction System", Chemistry-A European Journal, 2015, vol. 21, p. 11757-11766, thereby obtaining 6.3 g of complex solution of about 30% by mass.

[Evaluation of Oxygen Absorbing Ability]

By using the absorption test device schematically illustrated in FIG. 1, the oxygen absorption of the obtained liquid was measured.

The absorption test device was internally replaced with nitrogen and 5.25 g of sample solution was introduced into the device with a syringe. The replacement with nitrogen was then further carried out and degassing was performed for 1 hour or more in order to dry the system. Oxygen gas was then introduced at a predetermined pressure of 0 to 20 kPa under a temperature of 30° C., the pressure change due to absorption was measured with a pressure sensor and the oxygen absorption was estimated from the result.

At the tip of the arrow on the right hand side in FIG. 1 is connected to a vacuum pump which is not shown.

The obtained result is shown in FIG. 2. As shown in FIG. 2, it is demonstrated that about 0.5 mol of oxygen was adsorbed relative to 1 mol of the cobalt-salen complex including the ionic liquid coordinated thereto.

It was further verified that oxygen was desorbed by reducing pressure after the above adsorption, thereby verifying that the reaction was reversible.

Example 2

In Example 2, the absorbing ability of a complex solution was evaluated in the same manner as in Example 1 except that the concentration of the liquid having oxygen absorbing ability dissolved in the second ionic liquid was changed from 30% by mass in Example 1 to 50% by mass.

In the same manner as in Example 1, an ionic liquid formed with trihexyl(tetradecyl)phosphonium cation and N-methylglycine anion and 1.95 g of liquid having a cobalt-salen complex structure were obtained.

The obtained solution was dissolved in trihexyl(tetradecyl)phosphonium bis(trifluoromethanesulfonyl)imide synthesized in the same manner as in Example 1, thereby obtaining 1.5 g of complex solution of about 50% by mass.

The oxygen absorption of the obtained complex solution was measured on the device shown in FIG. 1 in the same procedures as in Example 1.

The result is shown in FIG. 3. As shown in FIG. 3, it is demonstrated that about 0.5 mol of oxygen was adsorbed relative to 1 mol of the cobalt-salen complex including the ionic liquid coordinated thereto.

Example 3

In Example 3, the absorbing ability of the liquid having oxygen absorbing ability per se was evaluated without using the second ionic liquid for dissolving the liquid having oxygen absorbing ability as in Examples 1 and 2.

However, it takes time to reach saturation absorption when a solution is not formed, and thus this embodiment is not preferable in practical view point for applications such as oxygen separation because of unfavorable conditions in view of the reaction time including the time for desorption reaction.

In the same manner as in Example 1, an ionic liquid formed with trihexyl(tetradecyl)phosphonium cation and N-methylglycine anion was obtained.

Then, 1.18 g of the obtained ionic liquid and 0.33 g of N,N'-bis(salicylidene)ethylenediaminocobalt(II) (produced by Tokyo Chemical Industry, Co., Ltd., purity >95%) were added to 50 ml of ethanol, stirred and mixed at room temperature for 3 hours followed by deoxygenation by nitrogen bubbling for 1 hour and removal of the solvent and unreacted matters by concentration under reduced pressure to obtain 1.25 g of desired liquid having a cobalt-salen complex structure.

By ultraviolet-visible spectroscopy, observation of the developed color and the like, it was verified that the anion of the ionic liquid was coordinated to the cobalt ion of the cobalt-salen complex. Also, by thermal analysis, it was verified that the liquid had high heat resistance of 200° C. or higher.

The oxygen absorption of the obtained complex solution was measured on the device shown in FIG. 1 in the same procedures as in Example 1.

The result is shown in FIG. 4. As shown in FIG. 4, it is demonstrated that about 1 mol of oxygen was adsorbed relative to 1 mol of the cobalt-salen complex including the ionic liquid coordinated thereto.

The following reason may be suggested: when a second ionic liquid is not included, two N-methylglycine anions in ionic liquid formed from trihexyl(tetradecyl)phosphonium cation and N-methylglycine anion coordinate to a cobalt ion in the cobalt-salen complex, and in the presence of oxygen, an oxygen molecule replaces one anion to be coordinated to the cobalt ion, resulting in one oxygen binding per complex. Although an oxygen molecule coordinates to two cobalt-salen complexes to stabilize the structure in case of Examples 1 and 2, an oxygen molecule coordinates to only one cobalt-salen complex in the present Example.

INDUSTRIAL APPLICABILITY

The liquid having oxygen absorbing ability of the present invention may be used in the fields requiring oxygen absorbing materials and oxygen separation membranes for the purposes of separation, concentration, removal, storage and the like of oxygen.

The invention claimed is:

1. A liquid having oxygen absorbing ability, comprising:
a cobalt-salen complex and an ionic liquid formed from an anion having an amine structure and a cation of an aliphatic quaternary phosphonium or ammonium having alkyl chains with each 2-20 carbon atoms, wherein
the ionic liquid includes an anion of N-methylglycine;
the anion of N-methylglycine of the ionic liquid is coordinated to a cobalt ion of the cobalt-salen complex in an axis direction;

the cobalt-salen complex is represented by the general formula (1):

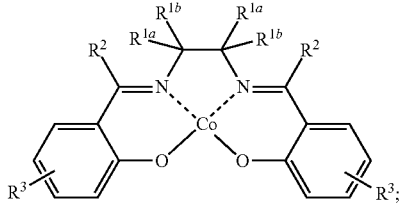
(1)

$R^{1a}$, $R^{1b}$, $R^2$, and $R^3$ are the same or different and respectively are a hydrogen atom, a halogen atom, an alkyl or haloalkyl group with 1-6 carbon atoms, an alkoxy group with 1-6 carbon atoms, an acyl group with 1-6 carbon atoms, an amino group, a nitro group, a nitrile group (cyano group), a vinyl group, or an aryl or heteroaryl group with 6-12 carbon atoms; and $R^{1a}$ and $R^{1b}$ may bind each other through an atom or an atomic group bound thereto to form a ring structure.

2. The liquid having oxygen absorbing ability according to claim 1, wherein the ionic liquid comprises a cation of trihexyl(tetradecyl)phosphonium.

3. The liquid having oxygen absorbing ability according to claim 1, wherein the cobalt-salen complex is N,N'-bis (salicylidene)ethylenediaminocobalt(II).

4. A complex solution having oxygen absorbing ability, comprising the liquid having oxygen absorbing ability according to claim 1 dissolved in a second ionic liquid.

5. The complex solution having oxygen absorbing ability according to claim 4, wherein the second ionic liquid comprises an anion of bis(trifluoromethanesulfonyl)imide.

6. The complex solution having oxygen absorbing ability according to claim 4, wherein the second ionic liquid is trihexyl(tetradecyl)phosphonium bis(trifluoromethanesulfonyl)imide.

7. The complex solution having oxygen absorbing ability according to claim 4, wherein the complex solution having oxygen absorbing ability comprises the liquid having oxygen absorbing ability at a concentration of 1 to 80% by mass in the second ionic liquid.

8. A method for producing the liquid having oxygen absorbing ability according to claim 1.

* * * * *